United States Patent
Palliyil Chundethodiyil et al.

(10) Patent No.: US 11,206,727 B1
(45) Date of Patent: Dec. 21, 2021

(54) PSEUDO-DIGITAL LIGHT EMITTING DIODE (LED) DIMMING WITH SECONDARY-SIDE CONTROLLER

(71) Applicant: Cypress Semiconductor Corporation, San Jose, CA (US)

(72) Inventors: Hariprasad Palliyil Chundethodiyil, Bangalore (IN); Prasanna Venkateswaran Vijayakumar, Whitefield (IN); Aniket Shashikant Mathad, Thane (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/909,552

(22) Filed: Jun. 23, 2020

(51) Int. Cl.
| | |
|---|---|
| H05B 47/18 | (2020.01) |
| H05B 45/34 | (2020.01) |
| H05B 45/345 | (2020.01) |
| H02M 3/335 | (2006.01) |
| H05B 45/325 | (2020.01) |
| H05B 45/382 | (2020.01) |
| H05B 45/355 | (2020.01) |
| H05B 45/10 | (2020.01) |

(52) U.S. Cl.
CPC ........ *H05B 47/18* (2020.01); *H02M 3/33592* (2013.01); *H05B 45/10* (2020.01); *H05B 45/325* (2020.01); *H05B 45/34* (2020.01); *H05B 45/345* (2020.01); *H05B 45/355* (2020.01); *H05B 45/382* (2020.01)

(58) Field of Classification Search
None
See application file for complete search history.

(56) References Cited

U.S. PATENT DOCUMENTS

| 7,855,520 B2 | 12/2010 | Leng |
| 8,907,581 B2 | 12/2014 | Ivankovic et al. |
| 8,947,016 B2 | 2/2015 | Melanson et al. |
| 9,999,106 B2 | 6/2018 | Huang et al. |
| 10,219,343 B1 * | 2/2019 | Schaemann .......... H05B 45/385 |

(Continued)

FOREIGN PATENT DOCUMENTS

| CN | 101489335 B | 12/2012 |
| CN | 109618454 A | 4/2019 |

(Continued)

OTHER PUBLICATIONS

Power Factor Corrected Dimmable LED Driver, ON Semiconductor, Semiconductor Components Industries, LLC, Sep. 2012, 22 pages.

*Primary Examiner* — Jany Richardson
(74) *Attorney, Agent, or Firm* — Lowenstein Sandler LLP

(57) ABSTRACT

Pseudo-digital light-emitting diode (LED) with secondary-side flyback control is described. In one embodiment, a Digital Addressable Lighting Interface (DALI) compatible driver includes a secondary-side controller coupled to a secondary winding of a transformer and coupled to a light-emitting element. The secondary-side controller includes a DALI-compatible interface to receive information. The secondary-side controller communicates a control signal with a primary-side controller via a galvanically-isolated link. The primary-side controller is coupled to a primary winding of the transformer. The DALI-compatible driver modifies a light output of the light-emitting element in response to the information.

20 Claims, 10 Drawing Sheets

(56) References Cited

U.S. PATENT DOCUMENTS

| | | |
|---|---|---|
| 10,362,644 B1 | 7/2019 | Xiong |
| 10,602,576 B2 | 3/2020 | Vonach |
| 10,616,968 B2 | 4/2020 | Wang |

FOREIGN PATENT DOCUMENTS

| | | |
|---|---|---|
| EP | 2489242 A1 | 8/2012 |
| EP | 2891382 A2 | 7/2015 |
| TW | I498046 B | 8/2015 |

\* cited by examiner

PSEUDO-DIGITAL LIGHT EMITTING DIODE (LED) DIMMING WITH SECONDARY-SIDE CONTROLLER

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. Power adaptor controllers developed for USB charging can be used for light-emitting diode (LED) lighting applications either in combination with USB-PD or independently. Two popular methods used in dimmable LED applications with switch-mode driver circuits are Analog Dimming and Digital pulse width modulation (PWM)-based dimming. High-brightness LED drivers that support various dimming protocols can use either PWM-based digital dimming or digital-to-analog converter (DAC)-based analog dimming schemes. Digital schemes offer better dimming resolution, but can suffer from visible light flicker issues, and therefore require high frequency controls that lead to electromagnetic interference (EMI) issues. Analog schemes offer an alternative for EMI flicker-sensitive applications, however may not be suitable for fine control and can be less efficient in a linear regulation mode.

BRIEF DESCRIPTION OF THE DRAWINGS

The disclosure is illustrated by way of example, and not of limitation, in the figures of the accompanying drawings.

DETAILED DESCRIPTION

Figure 1:
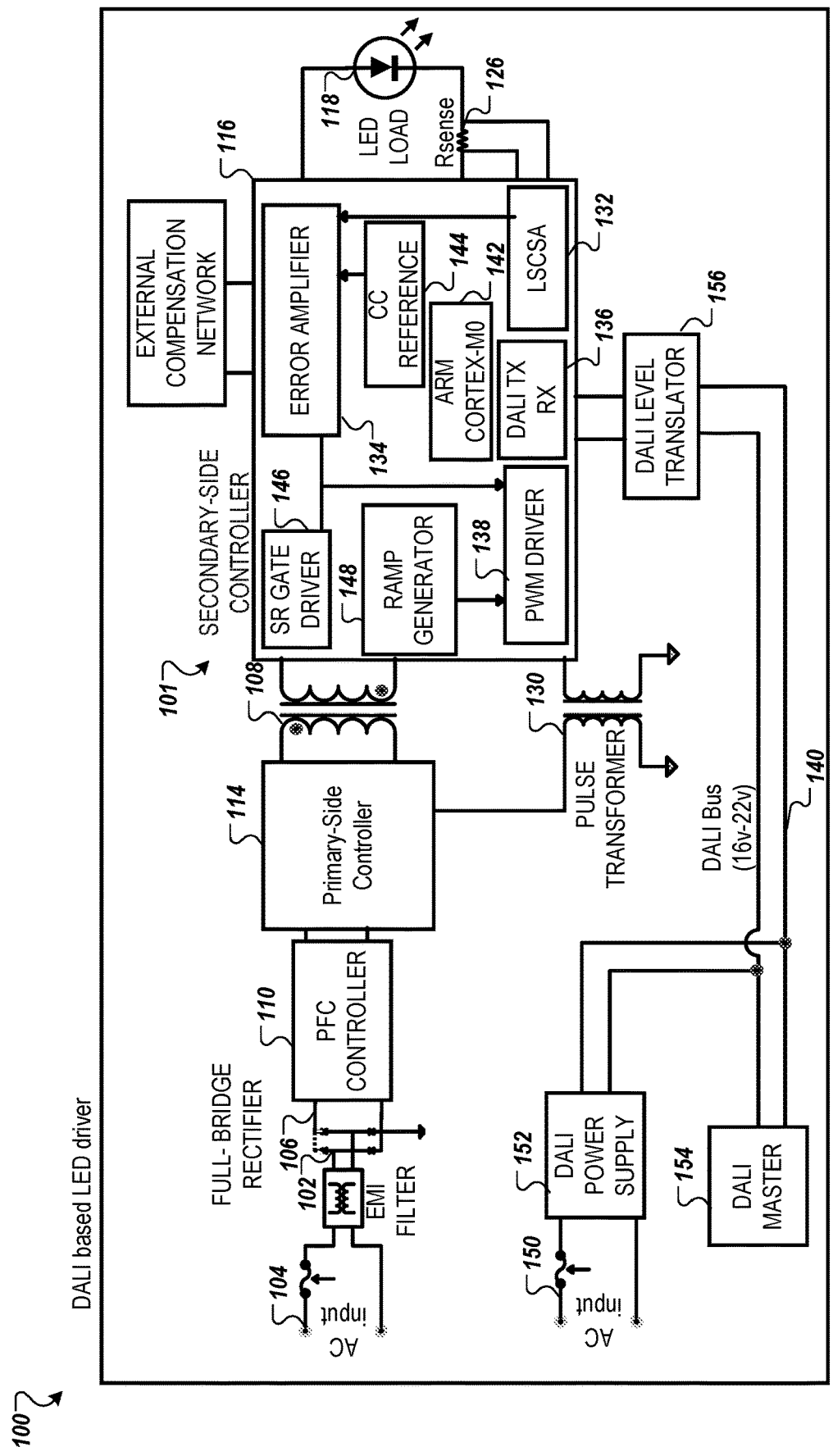
FIG. 1 is a block diagram of a secondary-side controlled Digital Addressable Lighting Interface (DALI)-compatible system according to one embodiment.

The following description sets forth numerous specific details such as examples of specific systems, components, methods, and so forth, in order to provide a good understanding of various embodiments of the techniques described herein for performing pseudo-digital light-emitting diode (LED) dimming using a secondary-side controller in a secondary-side controlled flyback converter, such as used in USB power delivery applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for performing pseudo-digital LED dimming using a secondary-side controller across a pulse transformer in a secondary-side controlled flyback converter coupled to a Digital Addressable Lighting Interface (DALI). Power conversion and integrated dimming control on a single switching network for an LED driver can utilize flyback topology with a secondary-side controller.

High brightness LED drivers that support various dimming protocols often use either pulse width modulation (PWM)-based digital dimming schemes or digital-to-analog converter (DAC)-based analog dimming schemes. Conventional digital schemes use low frequency PWM signals to over a power regulation circuit to offer precise dimming and good dimming resolution, but can suffer from visible light flickering, and therefore may require high frequency controls that can lead to electromagnetic interference (EMI) issues and higher bill of material (BOM) costs. Conventional analog schemes use current regulation based on a reference voltage and can offer an alternate solution without EMI and flicker issues. Analog schemes however, may be less efficient in a linear regulation mode and do not offer good dimming resolution. DALI is an open-standard dedicated protocol for digital lighting control that allows two-way communication between devices, so that a device can send and receive information about its status, any failures or errors, or the like. One way to implement an LED dimming scheme involves using an integrated circuit (IC) for alternating current-to-direct current (AC-DC) power control and a microcontroller unit (MCU) for communication protocols on a primary side of an isolation barrier. Another possible solution involves using a digital controller with an integrated DALI decoder. However, in such a case, a load current of the LED is measured on a secondary side of the isolation barrier while the control is on the primary side. Therefore, such a system has to use additional BOM components such as an opto-coupler to transfer current information about the LED. Use of an opto-coupler can limit the loop bandwidth, while limiting dimming resolution due to regulation error. Efficiency may be impacted, especially for high-current LEDs. Described herein are various embodiments of techniques for performing pseudo-digital LED dimming using a secondary-side controller across a pulse transformer in a secondary-side controlled flyback converter coupled to a DALI. The embodiments of pseudo-digital LED dimming described herein may address the above-mentioned and other challenges by providing programmable analog reference steps using a constant current (CC) loop based on secondary-side flyback control to achieve precise dimming. In some embodiments, the pseudo-digital LED dimming scheme described herein may be used in a secondary-side controlled flyback converter. Alternatively, the pseudo-digital LED dimming scheme can be used in other secondary-side controlled converters. The pseudo-digital LED dimming scheme allows for both measuring LED current and controlling the LED from the secondary side, and can use the CC loop within the secondary-side controller for LED dimming with good dynamic response and the resolution required for a DALI system without compromising other aspects of performance or adding to BOM cost. A pseudo-digital LED dimming controller can translate the required dimming level to a CC loop (also referred to as a CC control loop) set reference point, which can be programmable based on the required dimming resolution.

The pseudo-digital LED dimming system described herein can have high frequency switching harmonics, which can simplify the system design for electromagnetic compatibility and significantly reduce the light flicker that is perceivable to human eyes.

The embodiments described herein may address the above-mentioned and other challenges by providing, a serial bus-compatible power supply device, such as a serial bus power delivery (SBPD) device with a power control analog subsystem having hardware, firmware, or any combination to communicate information, including a control signal from a secondary-side controller to control an LED from a secondary side, across a galvanic isolation barrier. In one embodiment, the galvanic isolation barrier may be provided by a pulse transformer. In other embodiments, the galvanic isolation may be provided by an opto-coupler, a capacitive isolator, or the like. The SBPD (also referred to as a "source device" herein) may be a USB compatible power supply device. The embodiments described herein can also be implemented in other types of power adapters, power converters, power delivery circuits, or the like.

FIG. 1 is a block diagram of a secondary-side controlled DALI-compatible system 100 with a DALI-compatible LED driver circuit 101 according to one embodiment. In some embodiments, the secondary-side controlled DALI-compatible system 100 may be a secondary-side controlled converter or a secondary-side controlled flyback converter. The secondary-side controlled DALI-compatible system 100 can be part of an AC-DC power converter device. The secondary-side controlled DALI-compatible system 100 includes a rectifier 102 (e.g., full-bridge rectifier) coupled between AC input terminals 104 and a rectified DC line 106 (VIN), a flyback transformer 108, the flyback transformer 108 including a primary winding coupled to the rectified DC line 106, a primary-side controller 114, and a secondary-side controller 116, which is part of the DALI-compatible LED driver circuit 101. Power factor correction (PFC) controller 110 is coupled between the rectified DC line 106 and the primary-side controller 114. The primary winding of the flyback transformer 108 is coupled to the primary-side controller 114 and a secondary winding of the flyback transformer 108 is coupled to the secondary-side controller 116. A pulse transformer 130 is coupled to the secondary-side controller 116 and the primary-side controller 114. The pulse transformer 130 provides galvanic isolation between the primary side and the secondary side by acting as a galvanic isolation barrier. An LED 118 and a resistor 126 are coupled to the secondary-side controller 116. Although depicted as a pulse transformer, in other embodiments, the galvanic isolation can be provided by an opto-coupler (also referred to as an opto-isolator). Alternatively, the galvanic isolation can be provided by a capacitive isolator. In other embodiments, the LED 118 can be a different type of light-emitting element, such as an organic LED, a resistive filament, or the like.

The secondary-side controller 116 includes a DALI-compatible interface 136 which is coupled to a DALI system. The secondary-side controlled DALI-compatible system 100 includes a second set of AC input terminals 150 which are coupled to a DALI power supply 152. A DALI master device 154 is coupled to a level translator 156 which is coupled to the DALI-compatible interface 136 and the secondary-side controller 116. The DALI power supply 152 supplies power to the DALI master device 154 and the level translator 156.

The secondary-side controller 116 includes a DALI transceiver 136 to communicate (e.g., transmit and receive) information with the DALI master device 154 via the level translator 156. The secondary-side controller 116 further includes a low-side current-sense amplifier (LSCSA) 132, an error amplifier (EA) 134 coupled to the LSCSA 132, and a PWM driver circuit 138 coupled to the EA 134. The PWM driver circuit 138 sends a control signal as a pulse over the pulse transformer 130. In the case where the galvanic isolation is provided by an opto-coupler rather than a pulse transformer, the PWM driver circuit 138 is an optical transceiver or an optical transmitter and sends the control signal as an optical signal over the opto-coupler. The secondary-side controller 116 further includes a processing device 142 (e.g., such as ARM CORTEX-MO), a reference current input 144, a synchronous rectifier gate driver 146, and a ramp generator 148. The reference current (e.g., a level of the CC loop reference current) can be set based on programmable digital steps which are based on the required intensity level (e.g., as specified by the information received by the secondary-side controller over the DALI-compatible interface). It should be noted that a pseudo-digital dimming scheme refers to the steps being programmable.

In other embodiments, the LSCSA 132 can be another type of sense amplifier, such as a current-shunt amplifier, a voltage sense amplifier, or the like.

The DALI-compatible LED driver circuit 101 can be designed to work with the secondary-side controller 116 by controlling a brightness (or dimming) of the LED 118 in steps of current limit instead of using a digital PWM-based dimming approach. Such a solution allows for the use of flyback converter topology with a secondary side-based control for regulating the power delivery to the LED 118.

DALI is a two-way communication system which implements standards for LED drivers and ballasts to recognize and send messages to establish lighting control. The DALI system includes the DALI master device 154 (e.g., the DALI master controller), and the DALI power supply 152. The DALI system is connected to slave devices (such as LED drivers, like the DALI-compatible LED driver circuit 101) by a two-wire network 140. The DALI-compatible LED driver circuit 101 can be used as a DALI slave controller to implement the communication interface with the secondary-side controlled DALI-compatible system 100 and regulate the LED power control to the LED 118. In one embodiment, the DALI standard requires a communication interface that uses speeds up to 1.2 Kbps data rate over the two-wire network 140 (also referred to as two-line wired interface), which can be implemented using firmware and a hardware timer block.

For lighting applications, such as LED dimming and control, the current supplied to the LED should be controlled to be constant and with minimum rippling. This can be achieved by using a CC loop, which uses the LSCSA 132 to measure (or sense) the current supplied to the LED and the EA 134 can compare it with an internal reference current from the reference current input 144. The internal reference current corresponds to a set current point, as will be described in further detail below. The output of the comparison by the EA 134 is input to the PWM driver circuit 138. Further an output of the ramp generator 148 is input to the PWM driver circuit 138. The PWM driver circuit 138 compares the output of the comparison and the output of the ramp generator 148 to generate pulse for regulating the output current to drive the LED 118. In general, with secondary-side flyback control, a wide range of current outputs can be supported by the LED by a direct feedback and dimming mechanism.

Figure 2:
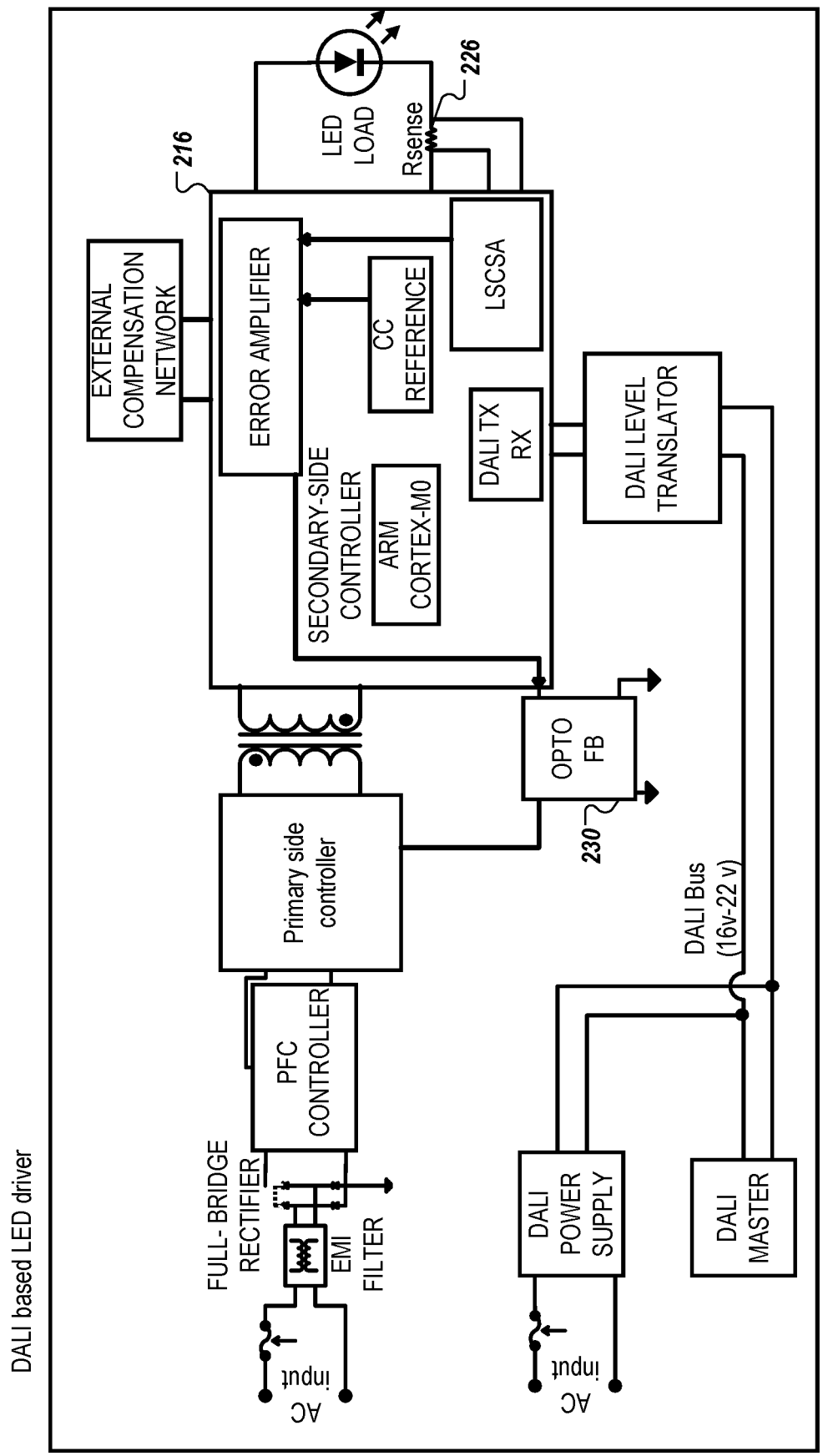
FIG. 2 is a block diagram of a secondary-side controlled DALI-compatible system according to one embodiment.

FIG. 2 is a block diagram of a secondary-side controlled DALI-compatible system 200 with a DALI-compatible LED driver circuit 101 according to one embodiment. The secondary-side controlled DALI-compatible system 200 is similar to the secondary-side controlled DALI-compatible system 100 of FIG. 1 except where noted below. In the secondary-side controlled DALI-compatible system 200, the synchronous rectifier gate driver 146, the ramp generator 148, the PWM driver circuit 138, and the pulse transformer 130 are replaced by an opto-coupler 230.

Figure 3:
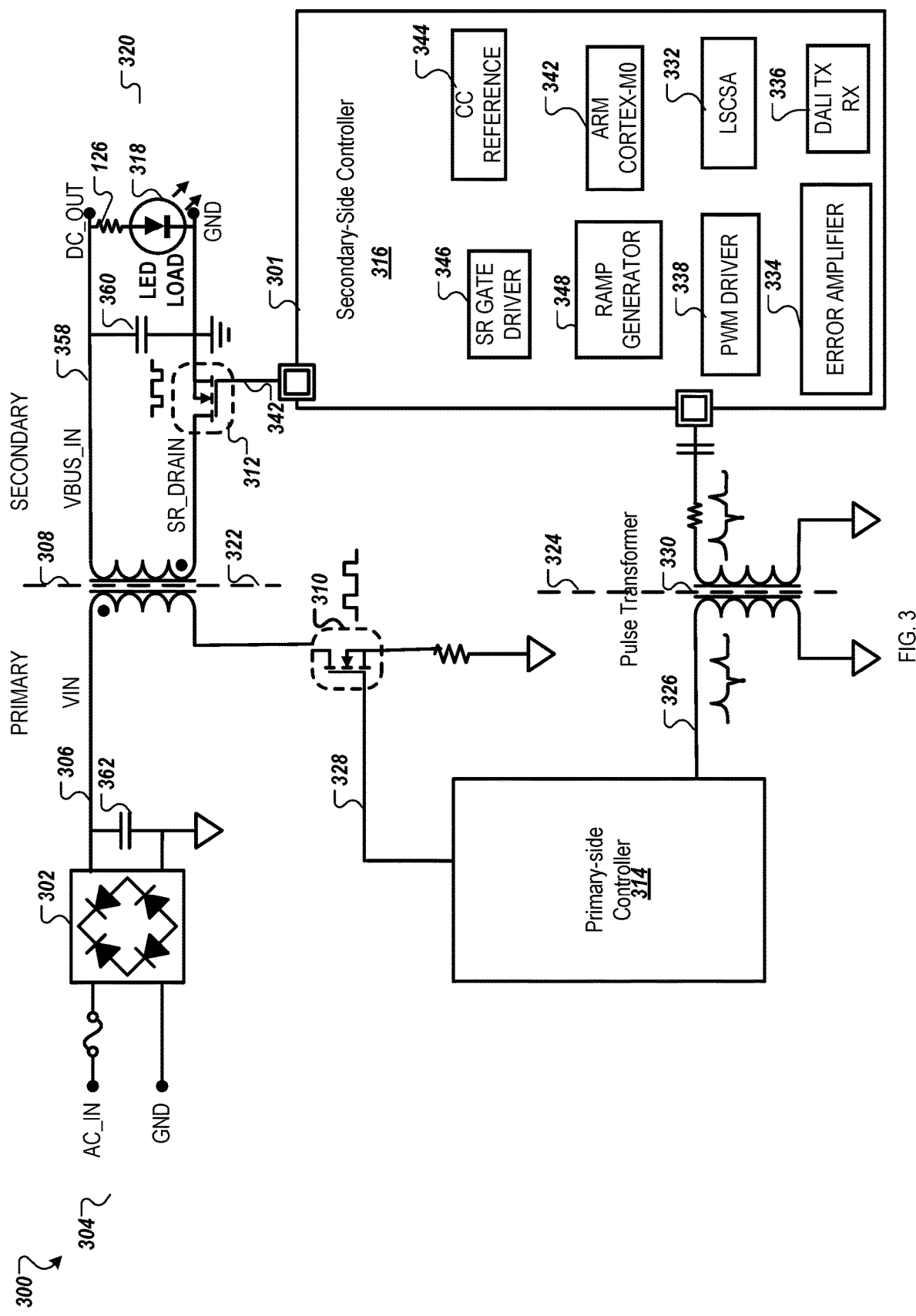
FIG. 3 is a block diagram of a secondary-side controlled DALI-compatible system according to one embodiment.

FIG. 3 is a block diagram of a secondary-side controlled DALI-compatible system 300 with a DALI-compatible LED driver circuit 101 according to one embodiment. Although not all components of the secondary-side controlled DALI-compatible system 300 are shown, the secondary-side controlled DALI-compatible system 300 is the same or similar to the secondary-side controlled DALI-compatible system 100 of FIG. 1 as noted by similar reference numbers. In some embodiments, the secondary-side controlled DALI-compatible system 300 may be a secondary-side controlled flyback converter. The secondary-side controlled DALI-compatible system 300 includes a rectifier 302 (e.g., full-bridge rectifier) coupled between AC input terminals 304 and a rectified DC line 306 (VIN), a flyback transformer 308, the flyback transformer 308 including a primary winding coupled to the rectified DC line 306, a primary-side power switch 310 (e.g., a primary-side FET, a power FET, or a primary FET), a secondary-side power switch 312 (e.g., secondary-side FET, power FET, or secondary FET), a primary-side controller 314, and a secondary-side controller 316. The rectified DC line 306 is coupled to a first end of a primary winding of the flyback transformer 308. VIN is the voltage on the rectified DC line 306 after the rectifier 302. A second end of the primary winding of the flyback transformer 308 is coupled to a primary drain of the primary-side FET 310. A first end of the secondary winding of the flyback transformer 308 is coupled to a direct current (DC) output line 358 (VBUS_IN) to provide a DC output to the LED 318. A second end of the secondary winding of the flyback transformer 308 is coupled to a secondary drain of the secondary-side power switch 312 (SR_DRAIN). VBUS_IN is the voltage on the DC output of the flyback transformer 358 that is supplied to the LED 318. SR_DRAIN is the drain node of the secondary-side FET 312. The DC output line 358 and the secondary-side power switch 312 are coupled to DC output terminals 320 to provide power to the LED 318. The resistor 126 is coupled to the LED 318 to provide feedback from the LED load to the secondary-side controller as an input.

The secondary-side controlled DALI-compatible system 300 can be used for AC-DC conversion with galvanic isolation between the inputs and outputs. The secondary-side controlled DALI-compatible system 300 uses an inductor split with the flyback transformer 308 with a galvanic isolation barrier 322 between a primary side and a secondary side. When the primary-side power switch 310 (the primary-side FET) is closed, the primary-side of the flyback transformer 308 is connected to the input voltage source. In this embodiment, the primary-side of the flyback transformer 308 is coupled to the rectifier 302. As the primary current and magnetic flux in the flyback transformer 308 increases, energy is stored in the transformer core of the flyback transformer 308. The voltage induced in the secondary winding is negative and blocked by the secondary-side power switch 312 (e.g., secondary rectifier). When the primary-side power switch 310 (the primary-side FET) is opened, the primary current and magnetic flux drop. The secondary voltage is positive, allowing current to flow from the flyback transformer 308. The energy stored in the transformer is transferred to an output load to the LED 318 (LED LOAD). An output capacitor 360 can be used to supply energy to the output load when the primary-side power switch 310 (e.g., the primary-side FET) is engaged. Thus, the flyback transformer 308, based on control of the primary-side power switch 310 can store energy and transfer the energy to the output of the secondary-side controlled DALI-compatible system 300.

It should also be noted that the secondary-side controlled DALI-compatible system 300 can include other components in the input stage, in the output stage, or in both. For example, a bulk capacitor 362 can be coupled between the output of the rectifier 302 and a ground node. During operation, the AC input power is rectified and filtered by the rectifier 302 (bridge rectifier) and the bulk capacitor 362. This creates a DC high voltage bus which is connected to the primary winding of the flyback transformer 308. Similarly, in the output stage, the secondary winding power is rectified and filtered, such as by a diode, a capacitor, output LC-filters, or the like, to reduce the output voltage ripple. Other output voltages can also be realized by adjusting the flyback transformer's turn ratio and the output stage. In some embodiments, other converters may be used instead of the flyback transformer, e.g., a switching converter, or the like.

The secondary-side controlled DALI-compatible system 300 can operate as an isolated power converter. The two prevailing control schemes are voltage mode control and current mode control. Both control schemes use a signal related to the output voltage. An opto-coupler or a pulse transformer can be coupled to the secondary-side controller 316 and can send a signal to the primary-side controller 314 to indicate the output voltage, such as described in more detail below. The opto-coupler or the pulse transformer can be used to obtain tight voltage and current regulations.

In the depicted embodiment, the secondary-side controller 316 is configured for communication with the DALI system over the DALI interface, and controlling an intensity of the LED 318 based on a CC reference from the reference current input 344. In one embodiment, the primary-side controller 314 is configured to receive a control signal 326 from the secondary-side controller 316 across the galvanic isolation barrier 324. The primary-side controller 314 applies a pulse signal 328 to the primary-side FET 310, in response to the control signal 326 to turn-on and turn-off the primary-side FET 310. The control signal is based on an error determined by the EA 334 between the load current (e.g., the DC output to the LED 318) and a current limit.

In one embodiment, the secondary-side controlled DALI-compatible system 300 includes a pulse transformer 330 coupled between the primary-side controller 314 and the secondary-side controller 316. The primary-side controller 314 can be configured to receive the control signal 326 from the secondary-side controller 316 as one or more pulses via the pulse transformer 330. The primary-side controller 314 can include a receiver and pulse generator to receive the pulse signal 328 from the secondary-side controller 316 across the galvanic isolation barrier 324. The receiver and pulse generator can change the primary-side turn-on pulse based on output of the flyback transformer 308 (e.g., Error Amplifier (EA) output). The primary-side turn-on pulse is used to turn on the primary-side FET 310. The primary-side controller 314 can also include a gate driver coupled to the receiver and pulse generator to drive a gate of the primary-side FET 310.

In one embodiment, the primary-side controller 314, in order to apply the pulse signal 328 to the primary-side FET 310, is configured to receive a turn-on pulse from the secondary-side controller 316. The primary-side controller 314 applies the turn-on pulse to the gate of the primary-side FET 310 via the gate driver. The turn-on pulse causes the primary drain of the primary-side FET 310 to go low (e.g., a first voltage level corresponding to a first state or representing the digital value of one). Subsequently, the primary-side controller 314 receives a turn-off pulse from the secondary-side controller 316 and applies the turn-off pulse to the gate of the primary-side FET 310 via the gate driver. The turn-off pulse causes the primary drain of the primary-side FET 310 to go high (e.g., a second voltage level corresponding to a second state or representing the digital value of zero).

In one embodiment, a DALI-compatible LED driver circuit 301 includes the secondary-side controller 316 which is coupled to the secondary winding of the flyback transformer 308 and to the LED 318. The secondary-side controller 316 includes a DALI-compatible interface 336 to receive information indicative of an intensity level for the LED 318 from the DALI master device 154 (not shown in FIG. 3). In one embodiment, the information can be used by the secondary-side controller 316 to translate a required dimming level to a load-current step value. The secondary-side controller 316 is configured to communicate the control signal 326 with the primary-side controller 314 via the galvanic isolation barrier (also referred to as a galvanically-isolated link) provided by the pulse transformer 330. The primary-side controller 314 is coupled to the primary winding of the flyback transformer 308. The DALI-compatible LED driver circuit 301 is configured to modify a light output of the LED 318 in response to the information from the DALI master device 154. In one embodiment, the DALI-compatible LED driver modifies the light output of the LED 318 by controlling the average current through it.

The secondary-side controller 316 further includes an LSCSA 332, an EA 334 coupled to the LSCSA 332, and a PWM driver 338 coupled to the EA 334. The LSCSA 332 measures a load current supplied to the LED 318 and the EA 334 determines an error between the load current and a current limit based on the intensity level of the LED 318. The current limit can be a reference current provided by a reference current input 344. The error can be a difference, a fraction, or based on another type of comparison. The PWM driver 338 sends the control signal 326 to the primary-side controller via the galvanic isolation barrier 324 provided by the pulse transformer 330. The control signal 326 is based on the error between the load current and the current limit.

The secondary-side controller 316 further includes a processing device 342 (such as a central processing unit (CPU), an ARM CORTEX-MO, or the like). The processing device 342 receives the information from the DALI master device 154 over the DALI-compatible interface 336 and the error from the EA 334. The processing device 342 controls the PWM driver 338 to send the control signal 326 based on the error.

The secondary-side controlled DALI-compatible system 300 can operate in a constant-voltage (CV) mode or a CC mode. The secondary-side controller 316 further includes a CC loop and a CV loop. The CV loop compares a load voltage of the LED 318 and a constant voltage reference and maintains the load voltage at the constant voltage reference during the CV mode. The CC loop maintains the load current at the current limit during the CC mode. During the CV mode, the LSCSA 332 switches operation of the secondary-side controller 316 from the CV mode to the CC mode once the load current crosses the current limit.

The secondary-side controller 316 can store other information, such as user-defined settings. For example, the user defined settings pertaining to the primary-side functionality, such as over-voltage (OV), under-voltage (UV), over-current (OC), short-circuit detection, over-temperature (OT), line voltage, peak current limits, or the like, can be stored in the non-volatile memory of the secondary-side controller 316. Firmware of the secondary-side controller 316 can transfer this information to the primary-side controller 314 in a similar manner at appropriate times, such as at boot-up or later during operation of the converter at a specific time.

As illustrated in FIG. 3, the secondary-side controller 316 can communicate one or more control signals for controlling all switches (e.g., the primary-side power switch 310, and the secondary-side power switch 312). A first control signal is communicated to the primary-side controller 314 over the galvanic isolation barrier 324, such as via the pulse transformer 330.

Figure 4A:
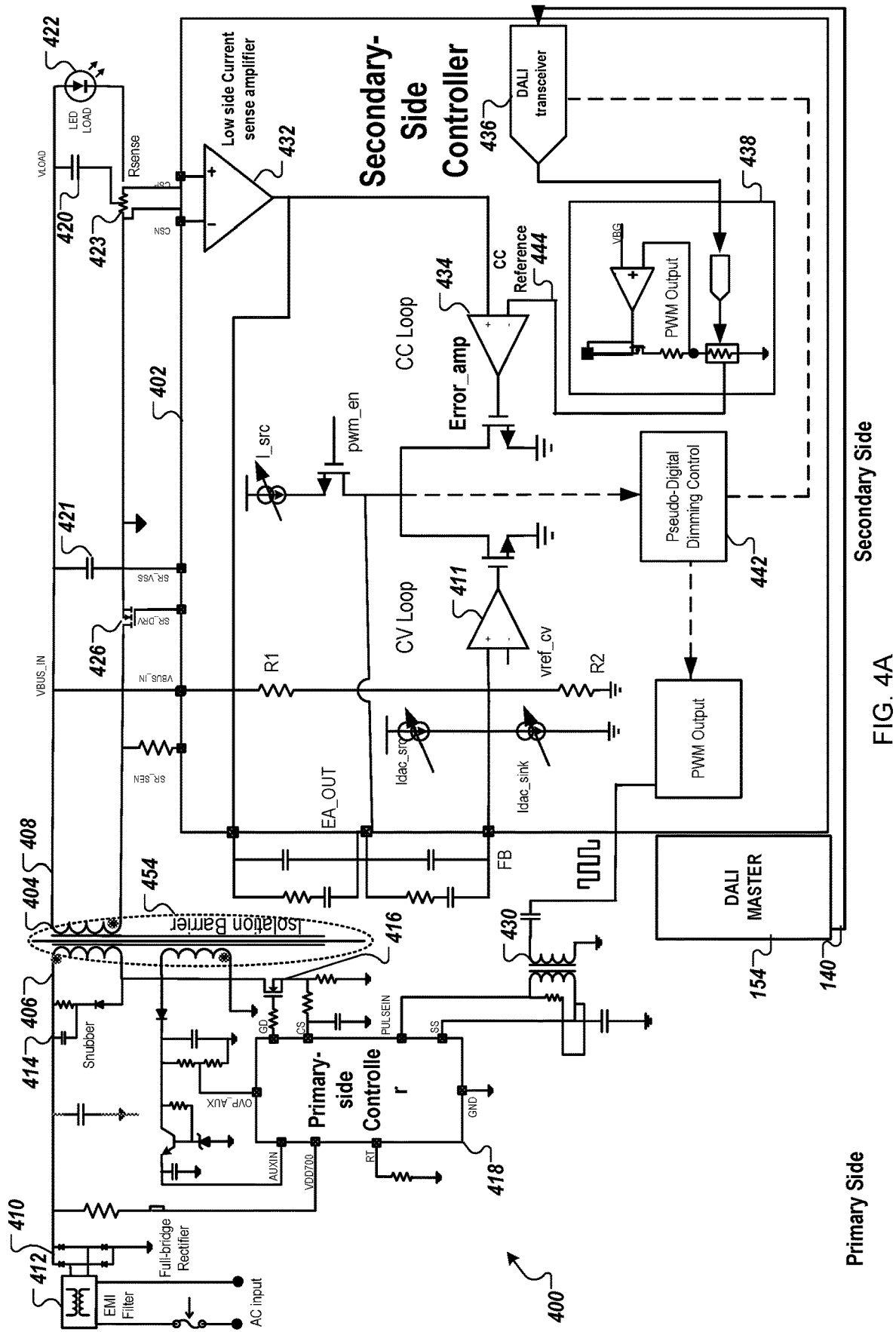
FIG. 4A is a schematic block diagram of secondary-side controlled DALI-compatible system including an embodiment of a secondary-side controller and having a synchronous rectifier (SR) architecture in accordance with the present disclosure.

FIG. 4A is a schematic block diagram of secondary-side controlled DALI-compatible system 400 including an embodiment of a secondary-side controller 402 and having a synchronous rectifier (SR) architecture in accordance with the present disclosure. Referring to FIG. 4A, the secondary-side controlled DALI-compatible system 400 generally includes a transformer 404 having a primary winding (NP) on a primary side 406 electrically connected or coupled to an AC input, and a secondary winding (NS) on a secondary side 408 coupled to a DC output.

On the primary side 406 a rectifying circuit, such as a bridge rectifier 410, and one or more input filters 412, 414, coupled to a first terminal of the transformer 404 rectify an AC input voltage and supply input power to the primary winding of the transformer 404. The input filters can include a first input filter 412, and a second filter, RC filter 414 including a resistor or resistive element (R2) and a capacitor coupled in parallel between the first terminal of the transformer 404 and a cathode of a diode or rectifier having an anode coupled to a second terminal of the transformer. Generally, as in the embodiment shown, the secondary-side controlled DALI-compatible system 400 further includes a power switch (PS 416), such as a primary field effect transistor (PR_FET), having a first or drain node coupled to the second terminal of the transformer 404, a second or gate node coupled to a primary side controller 418, and a third or source node coupled to the primary side controller and, through a current sensing element, such as a resistive element (RCS) to ground to sense a primary side current (I_primary) flowing through the primary winding when the PS 416 is closed or conducting. Generally, as in the embodiment shown, the primary side controller 418 is further coupled to the first terminal of the transformer 404 through a resistive element to receive a voltage or signal equal or proportional to the rectified AC input voltage.

On the secondary side 408 the secondary-side controlled DALI-compatible system 400 includes a filter capacitor 421 coupled between a third terminal of the transformer 404 and an electrical ground or ground terminal, and an output capacitor 420 coupled between a third terminal of the transformer 404 and an electrical ground provide a DC output voltage to an LED load 422. Generally, as in the embodiment shown the LED load 422 is further coupled to the secondary-side controller 402 through a number of communication channels to support various charging protocols.

In accordance with the present disclosure, the secondary-side controlled DALI-compatible system 400 further includes on the secondary side 408 a synchronous rectifier (SR 426), such as a synchronous rectifier field effect transistor (SR_FET), coupled between a fourth terminal of the transformer 404 and the ground terminal of the DC output. The SR 426 includes a first or drain node coupled to the fourth terminal of the transformer 404 and the secondary-side controller 402 to sense a voltage on the drain of the SR; a second or gate node coupled to the secondary side controller to drive or control the SR; and a third or source node coupled to the secondary side controller and the ground terminal of the DC output. In certain embodiments, such as that shown, the secondary-side controller 402 is realized or implemented as single integrated circuit (IC), or as a number of ICs packaged in a single IC package.

The secondary-side controller 402 includes a LSCSA 432, an EA 434, a DALI-transceiver 436, a PWM driver circuit 438, and a processing device 442. The secondary-side controller 402 receives information including an intensity level of the LED load 422 via the DALI transceiver 436 (e.g., the DALI-compatible interface) from the DALI master device 154. The secondary-side controller 402 begins operation in the CV mode based on an operating voltage of the LED load 422. A resistor 423 (the external resistor, Rsense) provides feedback to the LSCSA 432 which can trigger the EA 434 once the load current crosses the current limit. Once the load current crosses the current limit, the operation of the secondary-side controller 402 can be switched to CC mode. The DALI master device 154 controls the intensity (or brightness) level of the LED load 422 over a two-wire DALI network 140 powered by the DALI power supply 152 (not shown in FIG. 4A). The secondary-side controller 402 receives information including the required intensity level and can map the intensity level to the current limit based on a step size (e.g., dimming resolution). The LSCSA 432 and the EA 434 are configured to regulate the load current for the LED load 422 with the current limit based on the intensity level requested by the DALI master device 154.

The error amplifier 434 is part of a CC loop of the secondary-side controller 402. The LSCSA 432 measures the load current that is supplied to the LED load 422. The EA 434 receives the measurement of the load current and current limit from a reference current input 444. The EA 434 determines an error between the load current and the current limit based on the intensity level. The secondary-side controller 402 communicates a control signal to the primary-side controller over a pulse transformer 430 that acts as a galvanically-isolating link between the secondary side and the primary side. The secondary-side controller 402 further can modify the intensity level and a light output of the LED load 422 based on the information.

A maximum dimming resolution (e.g., a minimum step size) that can be achieved can be calculated based on a range of the load current, a gain of the LSCSA 432, a sensitivity of the EA 434, and a resistance of the resistor 423. In one embodiment, the load current range of the LED load 422 is between 0 mA and 200 mA with a load rating (e.g., a voltage rating) of 6.6 V, a minimum reference voltage accepted by the EA 434 is 130 mV, the sensitivity or resolution of the EA 434 is 10 mV, and the gain of the LSCSA 132 is 150. In such an embodiment, the minimum voltage that can be sensed at the input the LSCSA 132 is 130 mV/150 which is 0.866 mV. A minimum load current of the LED load 422 can be fixed at 17 mA, therefore the resistance required to detect the minimum load current is 0.866 mV/17 mA which is 50 mΩ. For a max load of 200 mA, a sense voltage input to the LSCSA is 200 mA*50 mΩ which is 10 mV. Since the gain of the LSCSA is 150, the input to the EA 434 is 10 mV*150 which is 1500 mV. Therefore, the number of steps that can be achieved is (1500 mV−130 mV)/10 mV which is 137 steps leading to a resolution for the regulation of the load current of (200 mA−17 mA)/137 which is 1.33 mA. It should be noted that the number of steps and the resolution can be different depending on factors such as the range of the current load, the gain of the LSCSA, the sensitivity of the EA, the resistance of the external resistor, and the like, and that the calculation present above is for exemplary purposes.

Based on the required intensity level received by the DALI transceiver 436 from the DALI master device 154, a set point of the current reference for CC control in the CC mode can be decided based on the step size (resolution). The step size can be dynamically varied (is configurable) based on the range of interest of the load current. For example the resistance of the resistor can be selected for different resolution requirements and range of load current. For example, the number of steps can range from 5 to 255, or can range between a different minimum and maximum value. In one embodiment, the secondary-side controlled DALI-compatible system 400 can support 16-bit forward frames and 8-bit backward frames with a baud rate of 1200. A refresh rate of the secondary-side controlled DALI-compatible system 400 can be decided based on a load step response and interface signal to meet the requirements of the DALI standard.

As shown in FIG. 4A, the secondary-side controlled DALI-compatible system 400 further includes an isolation circuit or barrier 454 to electrically isolate the secondary side 408 from the high AC input voltage present on the primary side 406. Because the transformer 404 is a step down transformer it is generally considered part of the isolation barrier 454. Additionally where, as in the embodiment shown, the secondary-side controlled DALI-compatible system 400 is a flyback converter or an AC-DC converter in which a control signal is provided to the primary side controller 418 from pins on the secondary-side controller 402, such as a feedback pin or PWM drive pin, the isolation barrier 454 can further include additional circuits or elements between the secondary side controller and the primary side controller 418 or PS 416. Details of these additional circuits or elements according to various embodiments are described below with reference to FIGS. 4C and 4D.

Figure 4B:
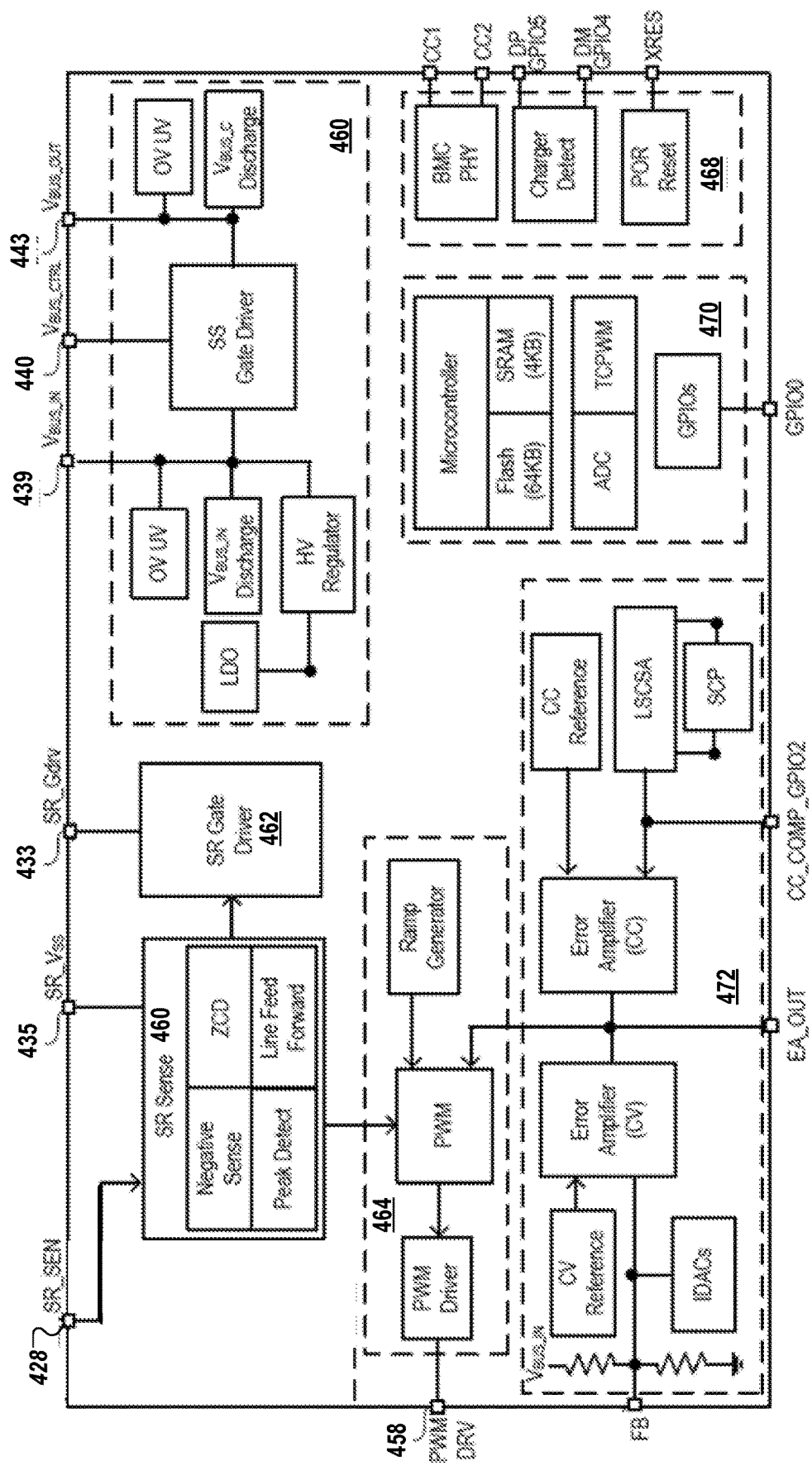
FIG. 4B is a detailed block diagram depicting an embodiment of the secondary-side controller of FIG. 4A.

FIG. 4B is a detailed block diagram depicting an embodiment of the secondary-side controller 402 of FIG. 4A. Referring to FIG. 4B, the secondary-side controller 402 generally further includes an SR sense circuit or block 460 and a SR gate driver circuit or block 462 coupled to the gate node of the SR 426 through the SR-drive pin 433. The SR sense block 460 is coupled to the drain node of the SR 426 through the single SR-SNS pin 428 and through the SR-Vss pin 435 to the source node of the SR. The SR sense block 460 generally includes a zero-crossing detector (ZCD) block, a negative-sensing (NSN) block, a peak-detector (PKD) block, and a line-feed-forward (LFF) block for sensing a voltage on the drain of the SR 426 to sense or detect a zero-crossing, a negative voltage, a peak (positive) voltage and a feed-forward operation. One or more outputs of the SR sense block 460 are coupled to the SR gate driver block 462 to control the SR 426 and to a pulse width modulation (PWM) circuit 464 to provide a signal 456 through the PWM drive pin 458 to the primary side controller 418 to control the PS 416. The PWM circuit 464 includes a ramp generator and PWM for generating a signal having a modulated pulse width, and a PWM driver for boosting a voltage or power of the signal to that necessary for driving the primary side controller 418 or PS 416. The PWM circuit 464 can include the PWM driver 338 and the ramp generate 348 of FIG. 3.

As shown in FIG. 4B, the secondary-side controller 402 further includes a secondary switch (SS) circuit 466. The SS circuit 466 includes OV-UV circuits or blocks for detection over voltage (OV) and under voltage (UV) conditions on $V_{BUS\_IN}$ 439 and $V_{BUS\_OUT}$ 443; low dropout (LDO) and high voltage (HV) regulators; and discharge circuits or blocks for discharging $V_{BUS\_IN}$ and $V_{BUS\_OUT}$.

An interface circuit 468 switch includes circuits or blocks for communicating with a device being powered or charged by the secondary-side controlled DALI-compatible system 400 to support various charging protocols. These circuits or blocks can include a Biphase Mark Code (BMC) physical layer (PHY) to communicate with device using certain charging protocols, a charger detect block and a power on reset (POR) block to reset the device, putting it into a known state on initiation of charging by the secondary-side controlled DALI-compatible system 400.

The secondary-side controller 402 further includes a microcontroller unit (MCU) subsystem 470 including logic a microprocessor or controller for executing programs stored memory in the MCU subsystem; analog-to-digital converters (ADC); a multipurpose Timer Counter Pulse Width Modulator (TCPWM) capable of performing a multiple functions necessary for operation of the MCU; and a number of general purpose input/outputs (GPIOs), only one of which is shown.

Lastly, the secondary-side controller 402 further includes a feedback circuit, or circuit 472, coupled to the feedback pin to provide error correction to the PWM circuit 464, and, in certain embodiments of the isolation barrier 454 to provide a feedback signal to the primary side controller 418. Generally, as in the embodiment shown circuit 472 includes a constant-voltage (CV) reference, a constant current (CC) reference, one or more error amplifiers and inter-digital analog converters (IDACs), a low-side current sense amplifier (LSCSA), and a short circuit protection (SCP) block.

Embodiments of the isolation barrier 454 of the secondary-side controlled DALI-compatible system 400 of FIG. 4A will now be described with reference to FIGS. 4C and 4D. It is noted that FIGS. 4C and 4D each illustrate one exemplary embodiments of the isolation barrier 454, and that other embodiments of the isolation barrier can be implemented that may or may not include all elements and components shown in these figures. Thus, the embodiments of FIGS. 4C and 4D are not intended to limit the present invention and the appended claims in any way.

Figure 4C:
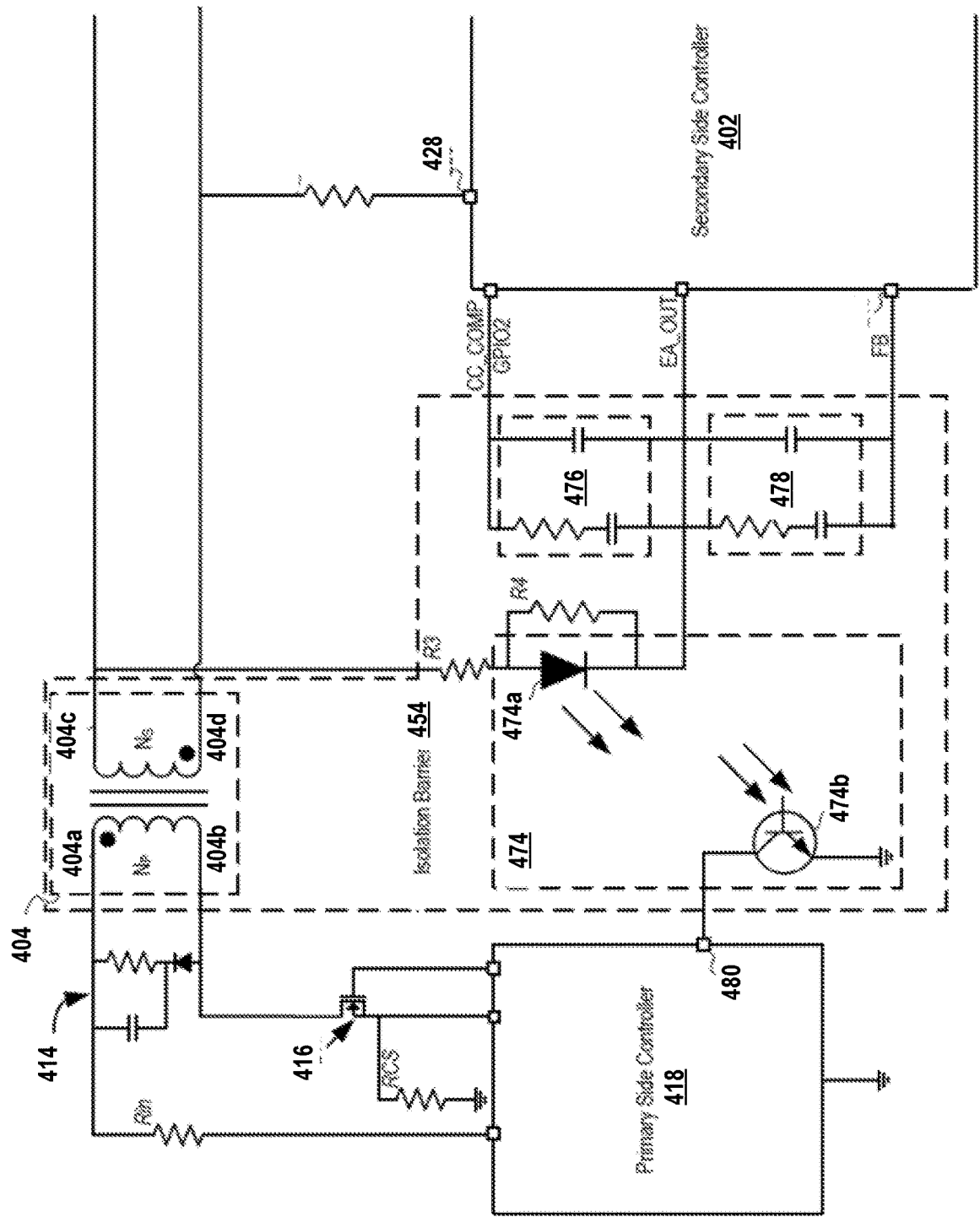
FIG. 4C is a schematic block diagram depicting an embodiment of the isolation barrier of FIG. 4A including an opto-isolator according to one embodiment.

FIG. 4C is a schematic block diagram depicting an embodiment of the isolation barrier of FIG. 4A including an opto-isolator 474 according to one embodiment. Referring to FIG. 4C, in a first embodiment the isolation barrier 454 includes an opto-isolator 474 to provide electrical isolation between the feedback pin of the secondary-side controller 402 and the primary side controller 418. Generally, the opto-isolator includes a light emitting element, such as a light emitting diode (LED) 474a and a light sensitive element, such as a light sensitive or phototransistor 474b. The LED 474a has a cathode coupled directly to an error amplifier output pin (EA_OUT), and an anode coupled to the third terminal 404c of the transformer 404 through a voltage divider including a first resistive element (R3) and a second resistive element (R4). The cathode of the LED 474a is further coupled to the FB pin and to a constant current compensation general purpose input/output (CC_COMP_GPIO), through resistor-capacitor filters or networks 476 and 478. The phototransistor 474b can include a bipolar NPN transistor, and is coupled to the primary side controller 418 through an FB_input pin 480. In this embodiment, the secondary-side controller 402 uses outputs from the error amplifier to take the feedback from the secondary side and pass it on to the primary controller over the opto-isolator 474. This architecture provides three key features: secondary side sensing and regulation, synchronous rectification, and charging port controller.

Figure 4D:
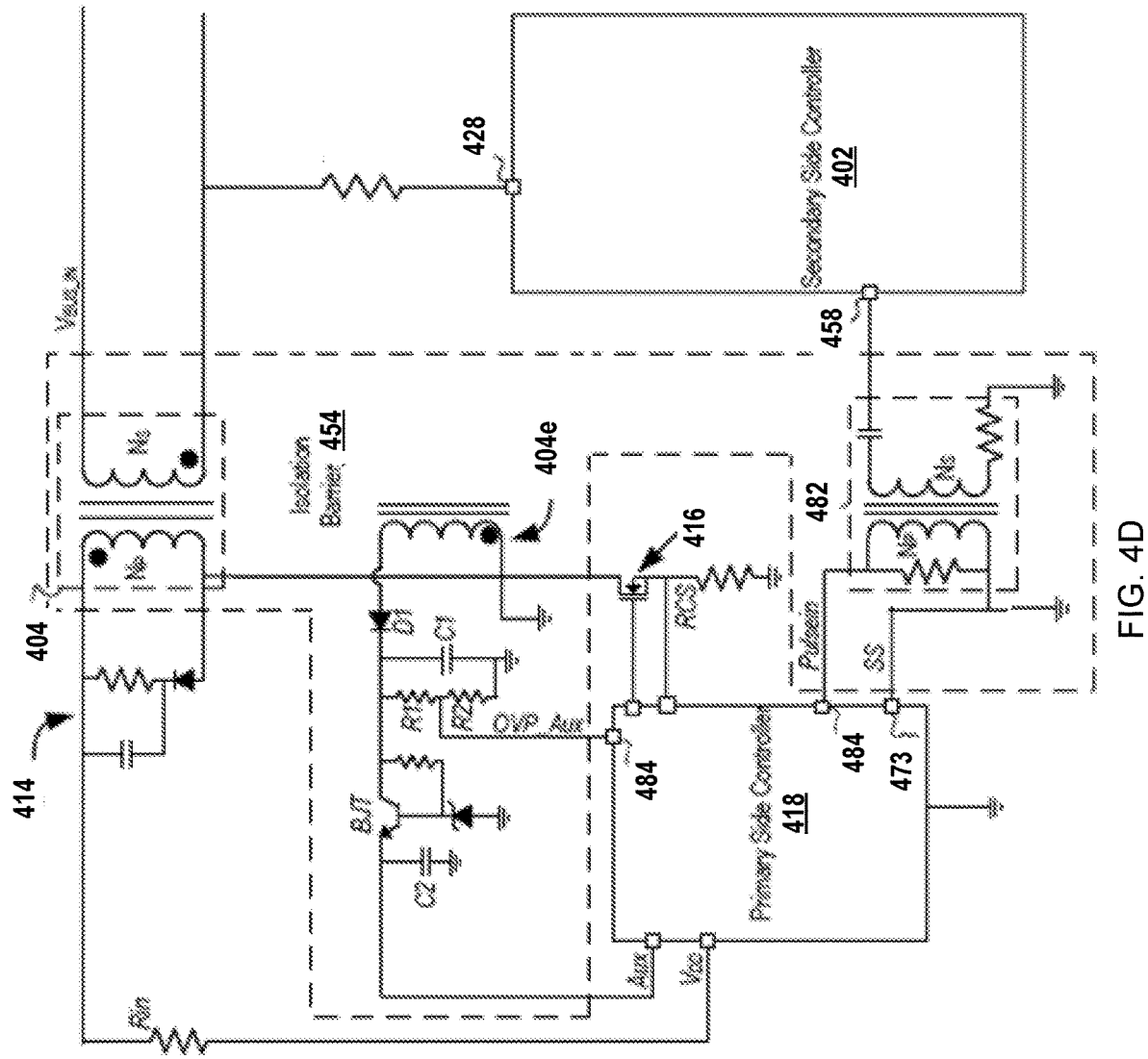
FIG. 4D is a schematic block diagram depicting another embodiment of the isolation barrier of FIG. 4A including a pulse transformer according to one embodiment.

FIG. 4D is a schematic block diagram depicting another embodiment of the isolation barrier of FIG. 4A including a pulse transformer 482 according to one embodiment. The pulse transformer 482 is coupled between the PWM drive pin 458 of the secondary-side controller 402 and a pulse_in pin 484 and a soft-start (SS) pin 473. The PWM drive pin 458 to the primary side controller 418 of the primary side controller 418 modulates the pulse width of the primary MOSFET in voltage mode control. In this architecture the primary side controller 418 engages the error amplifier and the programmable ramp generator of the PWM circuit 464 to determine the pulse width of the PWM signal. This PWM signal is transferred from the secondary-side controller 402 to the primary side controller 418 through the pulse transformer 482. This architecture, like that of FIG. 4C, also provides three key features: secondary side sensing and regulation, synchronous rectification, and charging port controller. The isolation barrier also includes an auxiliary coil of the transformer 404, which functions as a fly-back step-down transformer to provide power to primary side controller 418 via an Aux pin. The step-down transformer 404e along with a diode D1 followed by capacitor C1 to ground stores the stepped-down-voltage which is then clipped by a bipolar junction transistor (BJT) structure and then coupled to the Aux pin. This additional circuit helps to reduce total power consumption of the secondary-side controlled DALI-compatible system 400 as the primary side controller 418 is supplied through the Aux pin instead of by a separate power supply through another pin coupled to the first terminal 404a on the primary side 406 of the transformer 404 through Rin. A resistor divider R1, R2, connected to an over voltage protection (OVP)_AUX pin 484 of primary side controller 418 is used to sense a reflected voltage of $V_{BUS\_IN}$ on the secondary side 408 via the step-down transformer 404e. With this $V_{BUS\_IN}$ signal primary side controller 418 can disable PS 416, shown here as a PR_FET, using internal circuitry of the primary side controller.

Figure 5:
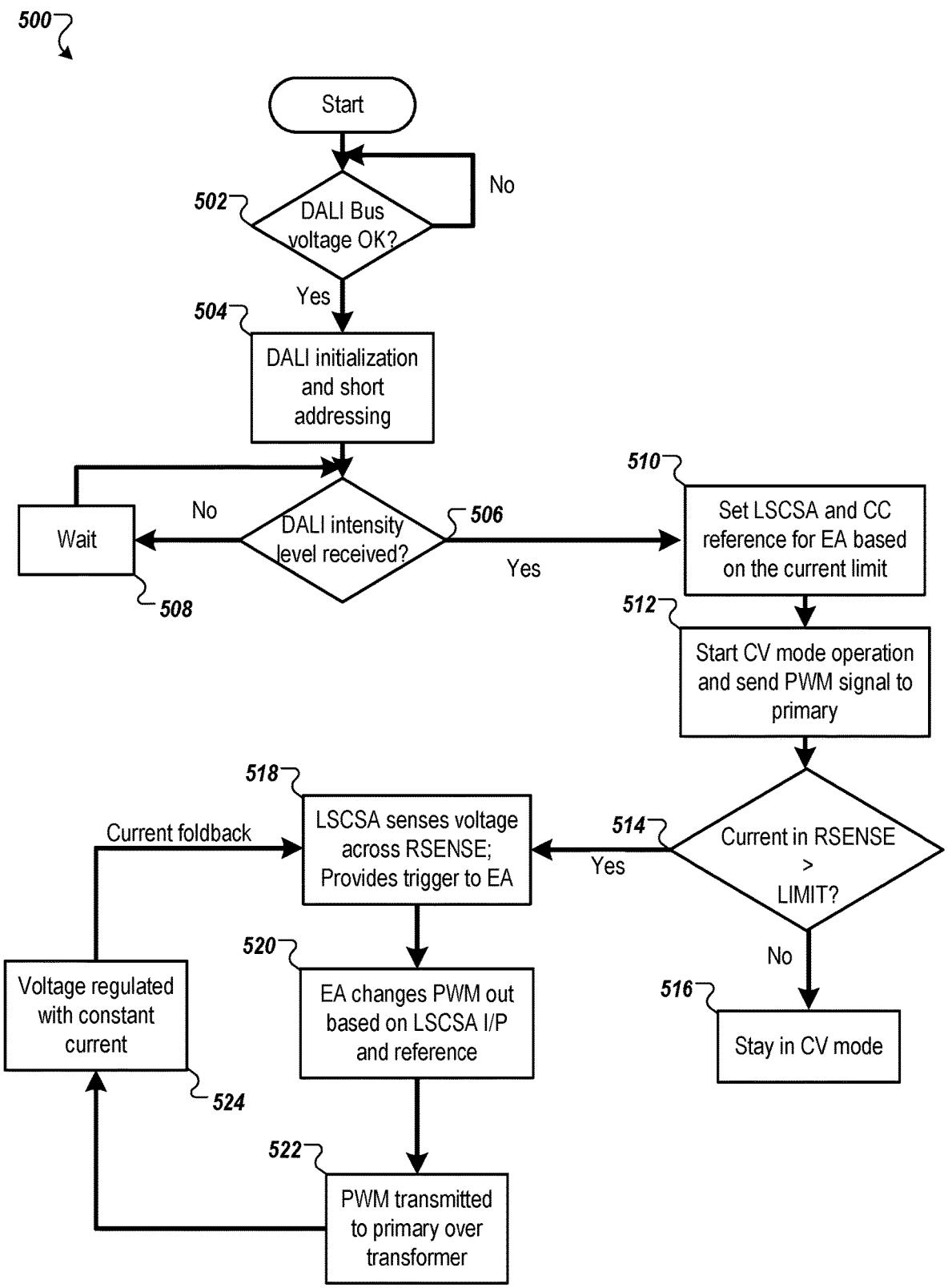
FIG. 5 is a flow diagram of a method of a pseudo-digital LED dimming scheme in a secondary-side controlled DALI-compatible system according to one embodiment.

FIG. 5 is a flow diagram of a method 500 of a pseudo-digital LED dimming scheme in a secondary-side controlled DALI-compatible system according to one embodiment. The method 500 may be performed by processing logic that comprises hardware (e.g., circuitry, dedicated logic, programmable logic, microcode, etc.), software, firmware, or a combination thereof. In one embodiment, the method 500 may be performed by any of the processing devices described herein. In one embodiment, the method 500 is performed by processing logic of a DALI-compatible LED driver circuit such as the DALI-compatible LED driver circuit 101 of FIG. 1 or the DALI-compatible LED driver circuit 301 of FIG. 3. In one embodiment, the method 500 is performed by processing logic of a secondary-side controller such as the secondary side controllers 116, 216, 316, or 402 of FIGS. 1-4 respectively. In one embodiment, the processing logic executes a firmware-based method that performs the following operations. In another embodiment, the processing logic has embedded code or logic and is configured to execute instructions to perform the following operations.

The method 500 begins by the processing logic checking if a DALI bus voltage is OK (e.g., within an appropriate range) (block 502). The processing logic checks the DALI bus voltage on the two-wire DALI bus (such as the two-wire network 140 of FIG. 1). Once the processing logic confirms the DALI bus voltage, the processing logic performs DALI initialization and short addressing (block 504) over the DALI bus. DALI initialization includes discovery of one or more DALI slave devices and or LED controllers as well as querying of the capabilities of the identified slave device(s). The processing logic communicates with the DALI master based on broadcast commands or commands specific to the DALI slave device with a specific address (referred to as short addressing). The processing logic checks if an intensity level has been received (block 506). The intensity level is received as information from a DALI master device (also referred to as a DALI master controller). If the intensity level has not been received, the processing logic waits (block 508). Once the intensity level has been received, the processing logic sets the LSCSA and CC reference for the EA based on the current limit (block 510). The processing logic starts operation in the CV mode and sends a PWM signal to the primary controller (block 512). The CV mode is started based on an operating voltage of the LED load and the processing logic sends the PWM signal to the primary controller over the galvanic isolation barrier provided by the pulse transformer. In the CV mode, the CV loop including the amplifier 411 of FIG. 4A is activated, and the amplifier 411 compares the operating voltage of the LED load to a constant voltage reference. The CV loop maintains the operating voltage of the LED load at the constant voltage reference during the CV mode. The processing logic checks if the load current through the external resistor (Rsense) (such as the resistor 126 of FIG. 1, the resistor 226 of FIG. 2, or the resistor 423 of FIG. 4A) is greater than a current limit (block 514). If the load current is less than the current limit, the processing logic maintains operation of the secondary-side controller in the CV mode (block 516). If the load current is greater than the current limit, the processing logic switches operation of the secondary-side controller to the CC mode (block 518).

In the CC mode the LSCSA measures (or senses) a voltage across the external resistor and provides a trigger to the EA. The trigger can be an enable signal, a pulse signal, or the like. The EA determines an error or a difference between the load current and the current limit, the error being indicative of the intensity level. The EA can be used to change the output of the PWM driver based on the LSCSA input (I/P) and the current limit (block 520). The processing logic causes the PWM driver to send a control signal based on the error to the primary-side controller via the galvanic isolation barrier of the pulse transformer (block 522). The control signal can be sent as PWM pulses and is based on the error determined by the EA. The processing logic then regulates the voltage to the LED load while maintaining a constant current (block 524); the method 500 ends.

Figure 6:
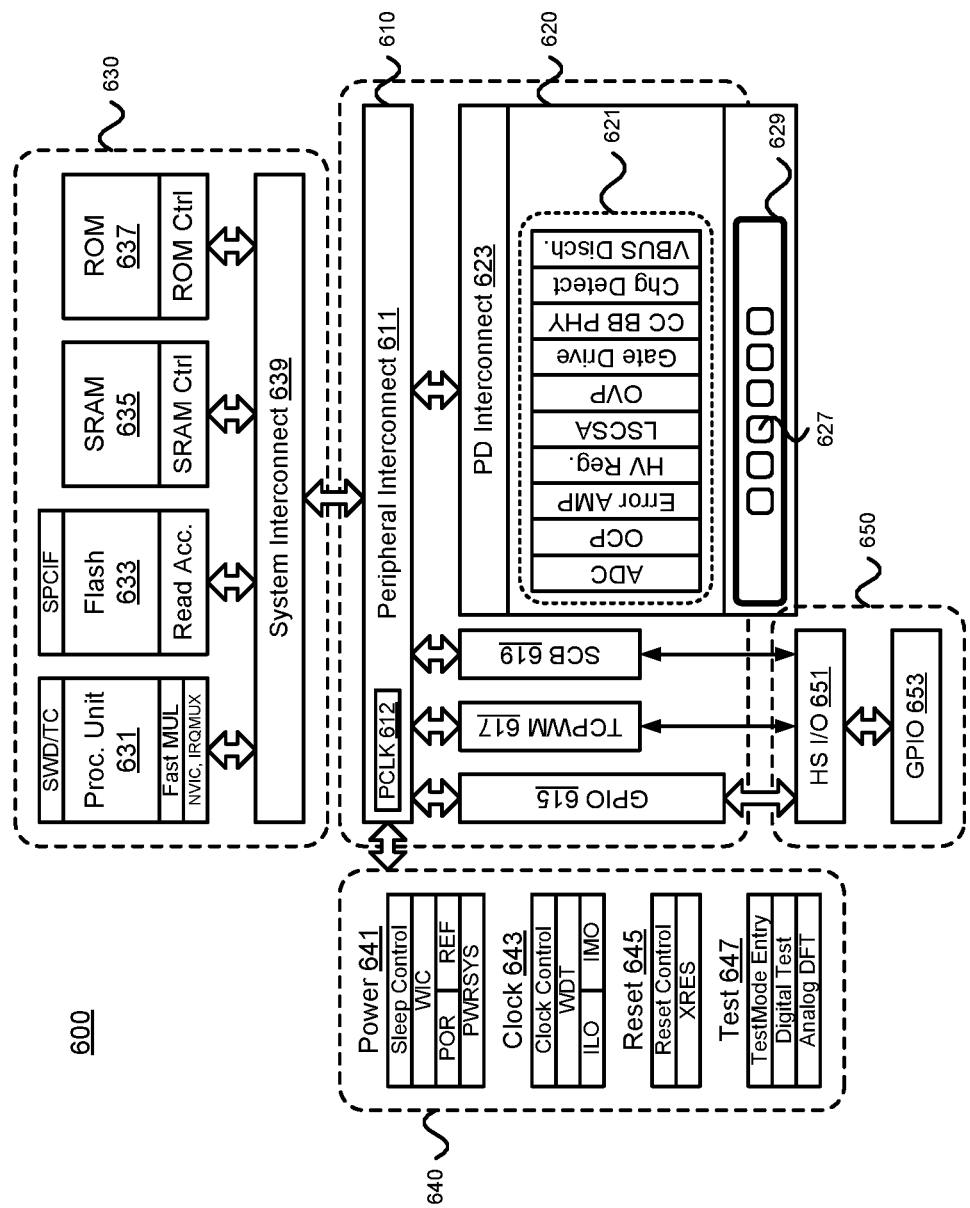
FIG. 6 is a block diagram illustrating a system for a secondary-side controlled DALI-compatible system for pseudo-digital LED dimming in accordance with some embodiments.

FIG. 6 is a block diagram illustrating a system 600 for a secondary-side controlled DALI-compatible system for pseudo-digital LED dimming in accordance with some embodiments. System 600 may include a peripheral subsystem 610 including a number of components for use in USB Power Delivery (USB-PD). Peripheral subsystem 610 may include a peripheral interconnect 611 including a clocking module, peripheral clock (PCLK) 612 for providing clock signals to the various components of peripheral subsystem 610. Peripheral interconnect 611 may be a peripheral bus, such as a single-level or multi-level advanced high-performance bus (AHB), and may provide a data and control interface between peripheral subsystem 610, CPU subsystem 630, and system resources 640. Peripheral interconnect 611 may include controller circuits, such as direct memory access (DMA) controllers, which may be programmed to transfer data between peripheral blocks without input by, control of, or burden on CPU subsystem 630.

The peripheral interconnect 611 may be used to couple components of peripheral subsystem 610 to other components of system 600. Coupled to peripheral interconnect 611 may be a number of general purpose input/outputs (GPIOs) pins 615 for sending and receiving signals. GPIOs 615 may include circuits configured to implement various functions such as pull-up, pull-down, input threshold select, input and output buffer enabling/disable, single multiplexing, etc. Still other functions may be implemented by GPIOs 615. One or more timer/counter/pulse-width modulator (TCPWM) 617 may also be coupled to the peripheral interconnect and include circuitry for implementing timing circuits (timers), counters, pulse-width modulators (PWMs) decoders, and other digital functions that may operate on I/O signals and provide digital signals to system components of system 600. Peripheral subsystem 610 may also include one or more serial communication blocks (SCBs) 619 for implementation of serial communication interfaces such as I2C, serial peripheral interface (SPI), universal asynchronous receiver/transmitter (UART), controller area network (CAN), clock extension peripheral interface (CXPI), etc.

For DALI applications, peripheral subsystem 610 may include a power delivery subsystem 620 coupled to the peripheral interconnect and comprising a set of PD modules 621 for use in power delivery, for example to power an LED.

PD modules 621 may be coupled to the peripheral interconnect 611 through a PD interconnect 623. PD modules 621 may include an analog-to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to power system 600; a low-side current sense amplifier (LSCSA) for measuring load current accurately, an over-voltage protection (OVP) module and an over-current protection (OCP) module for providing over-current and over-voltage protection on the VBUS line with configurable thresholds and response times; one or more gate drivers for external power field effect transistors (FETs) used in power delivery in provider and consumer configurations; and a communication channel PHY (CC BB PHY) module for supporting communications on a communication channel (CC) line. PD modules 621 may also include a charger detection module for determining that a charging circuit is present and coupled to system 600 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). Power delivery subsystem 620 may also include pads 627 for external connections and electrostatic discharge (ESD) protection circuitry 629. PD modules 621 may also include a communication module for retrieving and communicating information, such as control signals such as from a secondary-side controller to a primary-side controller.

GPIO 615, TCPWM 617, and SCB 619 may be coupled to an input/output (I/O) subsystem 650, which may include a high-speed (HS) I/O matrix 651 coupled to a number of GPIOs 653. GPIOs 615, TCPWM 617, and SCB 619 may be coupled to GPIOs 653 through HS I/O matrix 651.

System 600 may also include a central processing unit (CPU) subsystem 630 for processing commands, storing program information, and data. CPU subsystem 630 may include one or more processing units 631 for executing instructions and reading from and writing to memory locations from a number of memories. Processing unit 631 may be a processor suitable for operation in an integrated circuit (IC) or a system-on-chip (SOC) device. In some embodiments, processing unit 631 may be optimized for low-power operation with extensive clock gating. In this embodiment, various internal control circuits may be implemented for processing unit operation in various power states. For example, processing unit 631 may include a wake-up interrupt controller (WIC) configured to wake the processing unit up from a sleep state, allowing power to be switched off when the IC or SOC is in a sleep state. CPU subsystem 630 may include one or more memories, including a flash memory 633, and static random access memory (SRAM) 635, and a read-only memory (ROM) 637. Flash memory 633 may be a non-volatile memory (NAND flash, NOR flash, etc.) configured for storing data, programs, and/or other firmware instructions. Flash memory 633 may include a read accelerator and may improve access times by integration within CPU subsystem 630. SRAM 635 may be a volatile memory configured for storing data and firmware instructions accessible by processing unit 631. ROM 637 may be configured to store boot-up routines, configuration parameters, and other firmware parameters and settings that do not change during operation of system 600. SRAM 635 and ROM 637 may have associated control circuits. Processing unit 631 and the memories may be coupled to a system interconnect 639 to route signals to and from the various components of CPU subsystem 630 to other blocks or modules of system 600. System interconnect 639 may be implemented as a system bus such as a single-level or multi-level AHB. System interconnect 639 may be configured as an interface to couple the various components of CPU subsystem 630 to each other. System interconnect 639 may be coupled to peripheral interconnect 611 to provide signal paths between the components of CPU subsystem 630 and peripheral subsystem 610.

System 600 may also include a number of system resources 640, including a power module 641, a clock module 643, a reset module 645, and a test module 647. Power module 641 may include a sleep control module, a wake-up interrupt control (WIC) module, a power-on-reset (POR) module, a number of voltage references (REF), and a PWRSYS module. In some embodiments, power module 641 may include circuits that allow system 600 to draw and/or provide power from/to external sources at different voltage and/or current levels and to support controller operation in different power states, such as active, low-power, or sleep. In various embodiments, more power states may be implemented as system 600 throttles back operation to achieve a desired power consumption or output. Clock module 643 may include a clock control module, a watchdog timer (WDT), an internal low-speed oscillator (ILO), and an internal main oscillator (IMO). Reset module 645 may include a reset control module and an external reset (XRES) module. Test module 647 may include a module to control and enter a test mode as well as testing control modules for analog and digital functions (digital test and analog design for test (DFT).

System 600 may be implemented in a monolithic (e.g., single) semiconductor die. In other embodiments, various portions or modules of system 600 may in implemented on different semiconductor dies. For example, memory modules of CPU subsystem 630 may be on-chip or separate. In still other embodiments, separate-die circuits may be packaged into a single "chip," or remain separate and disposed on a circuit board (or in a USB cable connector) as separate elements.

Figure 7:
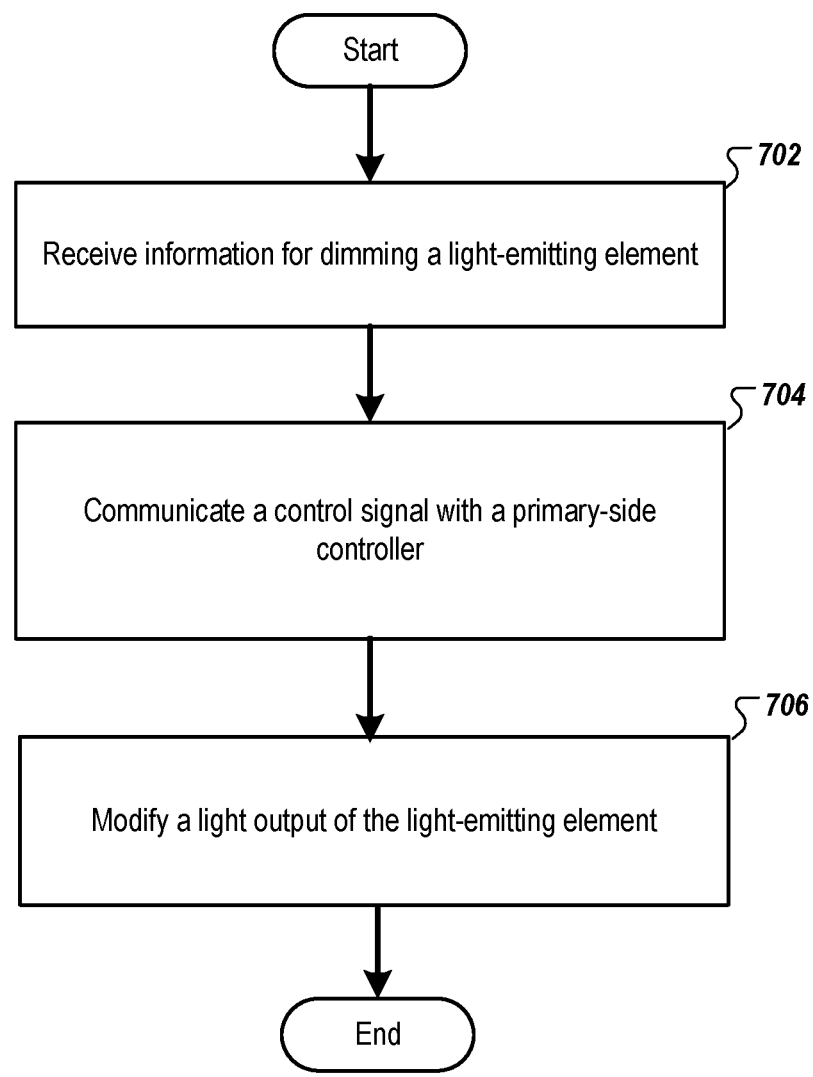
FIG. 7 is a flow diagram of a method of a pseudo-digital LED dimming scheme in a secondary-side controlled DALI-compatible system according to one embodiment.

FIG. 7 is a flow diagram of a method 700 of a pseudo-digital LED dimming scheme in a secondary-side controlled DALI-compatible system according to one embodiment. The method 700 may be performed by processing logic that comprises hardware (e.g., circuitry, dedicated logic, programmable logic, microcode, etc.), software, firmware, or a combination thereof. In one embodiment, the method 700 may be performed by any of the processing devices described herein. In one embodiment, the method 700 is performed by processing logic of a DALI-compatible LED driver circuit such as the DALI-compatible LED driver circuit 101 of FIG. 1 or the DALI-compatible LED driver circuit 301 of FIG. 3. In one embodiment, the method 500 is performed by processing logic of a secondary-side controller such as the secondary-side controllers 116, 216, 316, or 402 of FIGS. 1-4 respectively. In one embodiment, the processing logic executes a firmware-based method that performs the following operations. In another embodiment, the processing logic has embedded code or logic and is configured to execute instructions to perform the following operations.

The method 700 begins by the processing logic receiving information for dimming a light-emitting element (block 702). The light-emitting element can be an LED, an organic LED (OLED), a filament, or other light emitting device. The processing logic receives the information from a DALI master device over a DALI-compatible interface (such as a transceiver). The processing logic communicates a control signal with a primary-side controller (block 704). The control signal is communicated over a galvanically-isolated link, such as a galvanic isolation barrier of a pulse transformer. The processing logic modifies a light output of the light-emitting element (block 706); and the method 700 ends. The processing logic modifies the light output in response to the information.

In a further embodiment, the processing logic measures a load current that is supplied to the light-emitting element. The processing logic determines that there is a difference between the load current and a current limit, and determines an error between the load current and the current limit. The current limit is based on an intensity level that is specified by the information. The processing logic sends the control signal to the primary-side controller via the galvanically-isolated link. The control signal is based on the error. The control signal is configured to regulate the load current at the current limit.

In one embodiment, the control signal is sent as a pulse signal using a pulse width modulator, such as the PWM driver circuit 138 of FIG. 1, the PWM driver 338 of FIG. 3, the PWM driver circuit 438 of FIG. 4A, or the pulse transformer 482 of FIG. 4D. In another embodiment, the control signal is sent as an optical signal using an opto-coupler, such as the opto-coupler 230 of FIG. 2 or the opto-isolator 474 of FIG. 4C.

In a further embodiment, the processing logic compares a load voltage of the light-emitting element and a constant voltage reference. The processing logic maintains the load voltage at the constant voltage reference during a CV mode. The secondary-side controller is initialized to operate in the CV mode. Alternatively or additionally, the processing causes the load voltage to be maintained. The processing logic maintains the load current at the current limit during a CC mode. The processing logic switches operation of the secondary-side controller from the CV mode to the CC mode once the load current crosses (e.g., exceeds) the current limit. The current limit can be thought of as a current threshold value.

In another embodiment, the processing logic includes dimming-control firmware that can be executed by the secondary-side controller. The dimming control firmware receives the information from a DALI master device over the DALI-compatible interface. The dimming-control firmware receives the error from the EA. The dimming-control firmware controls a driver circuit to send the control signal based on the error to the primary-side controller via the galvanically-isolated link.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "communicating," "modifying," "measuring," "determining," "sending," "comparing," "maintaining," "switching," "controlling," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An integrated circuit (IC) comprising:
    a first terminal coupled to a secondary winding of a transformer;
    a second terminal coupled to a light-emitting element; and
    a secondary-side controller coupled to the first terminal and the second terminal, wherein the secondary-side controller comprises a Digital Addressable Lighting Interface (DALI)-compatible driver configured to receive information, wherein the secondary-side controller is configured to communicate a control signal with a primary-side controller via a galvanically-isolated link, the primary-side controller being coupled to a primary winding of the transformer, wherein the DALI-compatible driver is configured to modify a light output of the light-emitting element in response to the information, wherein the control signal is communicated based on an error to the primary-side controller via the galvanically-isolated link, and wherein a load current is regulated at a current limit based on an intensity level for the light-emitting element.

2. The IC of claim 1, wherein the information comprises an intensity level for the light-emitting element, wherein the secondary-side controller further comprises:
    a current sense amplifier (CSA) configured to measure the load current supplied to the light-emitting element;
    an error amplifier (EA) coupled to the CSA, the EA configured to determine the error between the load current and the current limit based on the intensity level; and
    a driver circuit coupled to the EA to send the control signal.

3. The IC of claim 2, wherein the secondary-side controller further comprises:
    a constant-voltage (CV) loop comprising an amplifier configured to compare a load voltage of the light-emitting element and a constant voltage reference, wherein the CV loop is configured to maintain the load voltage at the constant voltage reference during a CV mode; and
    a constant-current (CC) loop comprising the EA, wherein the CC loop is configured to maintain the load current at the current limit during a CC mode, wherein the CSA is configured to switch operation of the secondary-side controller from the CV mode to the CC mode once the load current crosses the current limit.

4. The IC of claim 2, wherein the secondary-side controller comprises a central processing unit (CPU) to execute dimming-control firmware, wherein the dimming-control firmware is configured to receive the information from a DALI master over the DALI-compatible interface, receive the error from the EA, and control the driver circuit to send the control signal based on the error to the primary-side controller via the galvanically-isolated link.

5. The IC of claim 2, wherein the driver circuit is a pulse width modulator configured to send the control signal as a pulse signal over the galvanically-isolated link, wherein the galvanically-isolated link comprises a pulse transformer.

6. The IC of claim 2, wherein the driver circuit is an optical transceiver or an optical transmitter configured to send the control signal as an optical signal over the galvanically-isolated link, wherein the galvanically-isolated link comprises an opto-coupler.

7. The IC of claim 2, wherein the driver circuit is a pulse width modulator configured to send the control signal over the galvanically-isolated link, wherein the galvanically-isolated link comprises a capacitive isolator.

8. The IC of claim 1, wherein the secondary-side controller comprises a DALI transceiver configured to communicate with a DALI master over the DALI-compatible interface.

9. A method comprising:
    receiving, by a secondary-side controller of a Digital Addressable Lighting Interface (DALI)-compatible driver from a DALI master device, information for dimming a light-emitting element, the secondary-side controller being coupled to a secondary winding of a transformer;
    communicating, by the secondary-side controller, a control signal with a primary-side controller via a galvanically-isolated link, the primary-side controller being coupled to a primary winding of the transformer; and
    modifying, by the DALI-compatible driver, a light output of the light-emitting element in response to the information, wherein the control signal is communicated based on an error to the primary-side controller via the galvanically-isolated link, and wherein a load current is regulated at a current limit based on an intensity level for the light-emitting element.

10. The method of claim 9, further comprising:
    measuring, by the secondary-side controller, the load current supplied to the light-emitting element;
    determining, by the secondary-side controller, the error between the load current and the current limit based on an intensity level specified in the information; and
    sending, by the secondary-side controller, the control signal.

11. The method of claim 10, wherein sending the control signal comprises sending a pulse signal using a pulse width modulator.

12. The method of claim 10, wherein sending the control signal comprises sending an optical signal using an opto-coupler.

13. The method of claim 9, further comprising:
    comparing, by the secondary-side controller, a load voltage of the light-emitting element and a constant voltage reference;
    maintaining, by the secondary-side controller, the load voltage at the constant voltage reference during a constant-voltage (CV) mode;
    maintaining, by the secondary-side controller, the load current at the current limit during a constant-current CC mode, the current limit being based on an intensity level specified in the information; and switching operation of the secondary-side controller from the CV mode to the CC mode once the load current crosses the current limit.

14. The method of claim 9, further comprising:

receiving, by dimming-control firmware executed by the secondary-side controller, the information from a DALI master over the DALI-compatible interface;

receiving, by the dimming-control firmware, the error between the load current and the current limit from an error amplifier (EA), the current limit being based on an intensity level specified in the information; and controlling, by the dimming-control firmware, a driver circuit to send the control signal based on the error to the primary-side controller via the galvanically-isolated link.

15. A Digital Addressable Lighting Interface (DALI)-compatible system comprising:

a DALI-compatible interface;

a transformer;

a primary-side controller coupled to a primary winding of the transformer; and a secondary-side controller coupled to a secondary winding of the transformer and the DALI-compatible interface, wherein the secondary-side controller is configured to:

receive information via the DALI-compatible interface, the information comprising an intensity level of a light-emitting element;

communicate a control signal with the primary-side controller via a galvanically-isolated link; and modify a light output of the light-emitting element in response to the information, wherein the control signal is communicated based on an error to the primary-side controller via the galvanically-isolated link, and wherein a load current is regulated at a current limit based on an intensity level for the light-emitting element.

16. The DALI-compatible system of claim 15, further comprising:

a full-bridge rectifier; and a power factor correction (PFC) controller coupled between the full-bridge rectifier and the primary-side controller.

17. The DALI-compatible system of claim 15, further comprising:

a power supply;

a DALI master device; and a level translator coupled to the DALI master device, the power supply, and the secondary-side controller, wherein the secondary-side controller comprises a DALI transceiver configured to receive the information from the DALI master via the level translator.

18. The DALI-compatible system of claim 15, wherein the secondary-side controller further comprises:

a current sense amplifier (CSA) configured to measure the load current supplied to the light-emitting element;

an error amplifier (EA) coupled to the CSA, the EA configured to determine the error between the load current and the current limit based on the intensity level; and a driver circuit coupled to the EA.

19. The DALI-compatible system of claim 18, wherein the secondary-side controller further comprises:

a constant-voltage (CV) loop comprising an amplifier configured to compare a load voltage of the light-emitting element and a constant voltage reference, wherein the CV loop is configured to maintain the load voltage at the constant voltage reference during a CV mode; and a constant-current (CC) loop comprising the EA, wherein the CC loop is configured to maintain the load current at the current limit during a CC mode, wherein the CSA is configured to switch operation of the secondary-side controller from the CV mode to the CC mode once the load current crosses the current limit.

20. The DALI-compatible system of claim 18, wherein the driver circuit is a pulse width modulator configured to send the control signal as a pulse signal over the galvanically-isolated link, wherein the galvanically-isolated link comprises a pulse transformer.

* * * * *